(12) United States Patent
Popat

(10) Patent No.: US 8,682,648 B2
(45) Date of Patent: Mar. 25, 2014

(54) METHODS AND SYSTEMS FOR ASSESSING THE QUALITY OF AUTOMATICALLY GENERATED TEXT

(71) Applicant: Google Inc., Mountain View, CA (US)

(72) Inventor: Ashok Popat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/864,180

(22) Filed: Apr. 16, 2013

(65) Prior Publication Data

US 2013/0259378 A1  Oct. 3, 2013

Related U.S. Application Data

(63) Continuation of application No. 12/366,329, filed on Feb. 5, 2009, now Pat. No. 8,442,813.

(51) Int. Cl.
*G06F 17/27* (2006.01)

(52) U.S. Cl.
USPC ............................................. 704/9; 382/292

(58) Field of Classification Search
USPC ................................ 704/1–10; 382/291, 292
See application file for complete search history.

(56) References Cited

U.S. PATENT DOCUMENTS

| | | | |
|---|---|---|---|
| 5,325,297 A | | 6/1994 | Bird et al. |
| 5,764,799 A | | 6/1998 | Hong et al. |
| 6,278,969 B1 * | | 8/2001 | King et al. .................... 704/7 |
| 6,678,415 B1 * | | 1/2004 | Popat et al. .................... 382/226 |
| 8,442,813 B1 * | | 5/2013 | Popat ............................. 704/9 |
| 8,482,581 B2 | | 7/2013 | Ratnakar et al. |
| 2002/0102966 A1 | | 8/2002 | Lev et al. |
| 2002/0191847 A1 | | 12/2002 | Newman et al. |
| 2004/0010758 A1 * | | 1/2004 | Sarkar et al. .................... 715/531 |
| 2007/0106721 A1 | | 5/2007 | Schloter |
| 2008/0080745 A1 | | 4/2008 | Vanhoucke et al. |
| 2008/0267504 A1 | | 10/2008 | Schloter et al. |
| 2010/0188419 A1 | | 7/2010 | Ratnakar et al. |

OTHER PUBLICATIONS

Second Office Action for Chinese Patent Application No. CN 201080005734.9, Apr. 19, 2013, 6 Pages.

* cited by examiner

*Primary Examiner* — Abul Azad
(74) *Attorney, Agent, or Firm* — Fenwick & West LLP

(57) ABSTRACT

A set of ordered characters is received in association with information specifying the locations of the characters within the image of the document. Language-conditional character probabilities for each character are determined based on a set of language models and the ordering of the characters. Neighbor characters associated with a target character are identified based on the locations of the characters. Language-conditional character probabilities associated with the neighbor characters and language-conditional character probabilities associated with the target character are combined to generate a local language-conditional likelihood associated with the target character, the local language-conditional likelihood representing a concordance of the target character to a language model.

21 Claims, 8 Drawing Sheets

METHODS AND SYSTEMS FOR ASSESSING THE QUALITY OF AUTOMATICALLY GENERATED TEXT

CROSS REFERENCE TO RELATED APPLICATIONS

This application is a continuation of U.S. application Ser. No. 12/366,329, filed Feb. 5, 2009, which is incorporated by reference herein in its entirety.

BACKGROUND OF THE INVENTION

1. Field of the Invention

This invention pertains in general to generating metrics which assess the quality of automatically generated digital text.

2. Description of the Related Art

Techniques which automatically generate digital or computer-readable text are widely used to organize and standardize large bodies of information. Optical character recognition (OCR) is a technology used to transform document images into computer readable text. Large scale projects such as the generation of libraries of digital text aim to scan images of books and generate digital text from the books using optical character recognition. Machine translation is another technology commonly used to generate large amounts of digital text by converting digital text in one language to another language. Machine translation and optical character recognition are often used in combination to standardize information into a common computer readable format.

As machine translation and optical character recognition are automated techniques, digital text generated using these techniques may be of variable quality due to errors. In some instances, these errors are due to the conversion of data such as characters or images that are not associated with the language of the document text. For instance, machine learning algorithms may attempt to translate an acronym or a piece of program code from English to French. Likewise, an optical character recognition program may attempt to recognize characters in a picture embedded in a page of text. The conversion of this data generates poor quality or "garbage" text.

Conventional approaches to recognizing garbage text include the use of a dictionary to determine whether automatically generated digital text is valid within a language. However, the use of dictionaries is limited because it is impossible to create a dictionary that includes all possible words in a language. For instance, dictionary creation is complicated by the large number of possible words in agglutinative languages such as German and Finnish in which individual words are compounded to create other words. Further, new words are adopted and used in different language systems on a continuous basis. The inclusion of technical terminology and colloquial language such as internet slang in text further complicates the use of dictionaries to determine whether automatically generated digital text corresponds to a language.

Due to these complications, alternate approaches to the use of dictionaries have been developed which use sequential models such as Markov models or n-gram models to compensate for unknown or unrecognized language. These models calculate a conditional probability of a word occurring based on the set of words which precede the word in text, therefore considering the context of the word based on the preceding words. However, these models suffer from the same shortcomings as the generic use of dictionaries as the conditional probability value for a word the model has not previously encountered is unknown or zero.

Other methods of assessing the quality of digital text generated using optical character recognition are based on criteria such as character morphology, pixel intensity, etc. As these models do not assess the quality of the text based on a language, these methods do not accurately identify the presence of garbage text. Accordingly, better methods of assessing the quality of digitally generated text are needed.

BRIEF SUMMARY OF THE INVENTION

The above and other difficulties are overcome by a computer-implemented method and computer system for assessing the quality of computer generated text.

One aspect provides a method for assessing the quality of computer generated text. A set of ordered characters generated from an image of a document is received in association with information specifying the locations of the characters within the image of the document. Language-conditional character probabilities are determined for each character based on a set of language models and the ordering of the characters, wherein each language-conditional character probability indicates a likelihood that the character is associated with a writing system represented by an associated language model. Neighbor characters associated with a target character of the set of ordered characters are identified based on the information specifying the locations of the characters, wherein the neighbor characters are within a defined distance from the target character in the image of the document. Language-conditional character probabilities associated with the neighbor characters and language-conditional character probabilities associated with the target character are combined to generate a local language-conditional likelihood associated with the target character, wherein the local language-conditional likelihood represents a concordance of the target character to a language model of the set of the language models and stored.

In another aspect, the described embodiments provide a computer system for assessing the quality of computer generated text, the computer system comprising one or more computing devices associated with a memory. The system further comprising a language-conditional character probability module stored in the memory and executable to receive a set of ordered characters generated from an image of a document in association with information specifying the locations of the characters within the image of the document. The language-conditional character probability module is further executable to determine language-conditional character probabilities for each character based on a set of language models and the ordering of the characters, wherein each language-conditional character probability indicates a likelihood that the character is associated with a writing system represented by an associated language model. The system further comprises a local language-conditional likelihood module stored in the memory and executable to identify neighbor characters associated with a target character of the set of ordered characters based on the information specifying the locations of the characters, wherein the neighbor characters are within a defined distance from the target character in the image of the document. The local language-conditional likelihood module is further executable to combine language-conditional character probabilities associated with the neighbor characters and language-conditional character probabilities associated with the target character to generate a local language-conditional likelihood associated with the target character, wherein the local language-conditional likelihood represents a concordance of the target character to a language model of the set of the language model and store the local language-conditional likelihood.

Another aspect is embodied as a computer-readable storage medium on which is encoded computer program code for identifying a generating a local language-conditional likelihood according to the above described method.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

I. Overview

Figure 1:
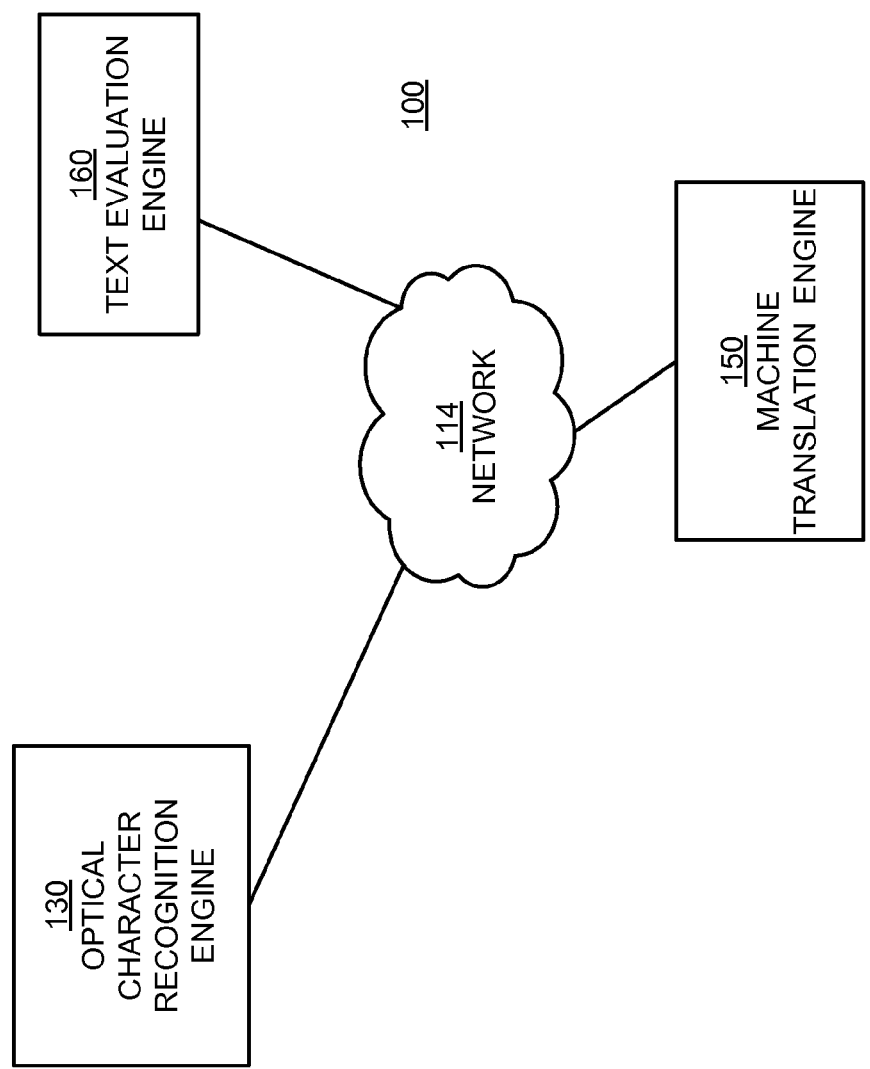
FIG. 1 is a high-level block diagram of a computing environment 100 according to one embodiment of the present invention.

FIG. 1 is a high-level block diagram of a computing environment 100 according to one embodiment. FIG. 1 illustrates an Optical Character Recognition Engine 130, a Machine Translation Engine 150 and a Text Evaluation Engine 160 connected to a Network 114. Although FIG. 1 illustrates the Text Evaluation Engine 160 as a single engine, in some embodiments the Text Evaluation Engine 160 can have multiple engines. Likewise, there can be multiple Optical Character Recognition Engines 130 and Machine Translation Engines 150 on the Network 114. Only one of each entity is illustrated in order to simplify and clarify the present description. There can be other entities on the Network 114 as well.

In some embodiments, the Optical Character Recognition Engine 130, the Machine Translation Engine 150 and a Text Evaluation Engine 160 are combined into a single entity.

The Optical Character Recognition Engine 130 generates digital text from scanned images of documents such as books. The Optical Character Recognition Engine 130 identifies a set of characters associated with fixed locations in the scanned images. A fixed location in the scanned image may be represented as a set of two-dimensional coordinates specifying the character's position on an x-axis and a y-axis. The Optical Character Recognition Engine 130 further associates the set of characters with a sequential order or "one-dimensional coordinates" specifying the position of the characters in the sequence of digital text generated from the document. The Optical Character Recognition Engine 130 submits the set of characters in association with their coordinates and the sequential order to the Text Evaluation Engine 160 for scoring and analysis.

The Machine Translation Engine 150 generates digital text by translating a first set of digital text into a second set of digital text using a translation model. The Machine Translation Engine 150 builds the translation model based on corpora of digital text associated with languages or writing systems. Unlike the Optical Character Recognition Engine 130, the Machine Translation Engine 150 generates only a sequential order of characters specifying the position of the characters in the generated digital text. According to the embodiment, the Machine Translation Engine 150 may submit the first set of un-translated digital text or the second set of translated digital text to the Text Evaluation Engine 160 for scoring and analysis. In alternate embodiments, the Machine Translation Engine 150 submits the corpora of digital text associated with languages or writing systems to the Text Evaluation Engine 160 for scoring and analysis. In these embodiments, the Machine Translation Engine 150 generates the translation model based on only digital text in the corpora that is associated with high text quality scores.

The Text Evaluation Engine 160 generates text quality scores based on the digital text and associated information generated by the Machine Translation Engine 150 and/or the Optical Character Recognition Engine 130. The Text Evaluation Engine 160 generates a set of language-conditional character probabilities for each character in the digital text. Each language-conditional character probability indicates how well the character and a set of characters that precede the character in the digital text concord with a language model. By generating the language-conditional character probabilities based on the preceding characters, the Text Evaluation Engine 160 uses information specific to a language without being subject to the shortcomings associated with dictionaries that are described above. The set of characters that precede the character is typically limited to a small number (e.g. 4-8 characters) such that characters in compound words and other joint words are given strong probability values based on the model.

The Text Evaluation Engine 160 further determines a set of neighbor characters which are proximate to the character. If the character is associated with digital text received from the Machine Translation Engine 150, the set of neighbor characters are proximate to the character in the ordered sequence of characters. If the character is associated with digital text received from the Optical Character Recognition Engine 130, the set of neighbor characters are proximate to the character in two dimensions.

The Text Recognition Engine 160 determines a local language-conditional likelihood for the character and its associated location based on the language-conditional character probabilities associated with a set of neighbor characters proximate to the character. This enables the calculation of a value for each character which represents how well the characters located within a defined proximity to the character concord with a language model. The calculation of such a value allows for the location-specific analysis of text quality.

The local language-conditional likelihood may be combined with other indicators of text quality to generate a text quality score. By calculating the text quality score associated with a character at a specified location based on a set of characters associated with the location, inconsistencies in the language model due to lack of data are minimized. Therefore, text within an area which is of uniformly poor quality at a location is correctly identified, while a single character associated with a bad language-conditional character probability will not have a large impact on the overall text quality score. For instance, a character representing a small typographical error will not be given an overly low text quality score if the characters proximate to the character concord well with the language model.

Determining text quality associated with a location allows the Text Recognition Engine 160 to localize digital text generated by the Machine Translation Engine 150 which does not correspond to language models. Digital text generated by the Machine Translation Engine 150 which does not correspond to language models may be associated with slang, acronyms or computer programming languages such as markup languages.

Determining text quality associated with a location further allows the Text Evaluation Engine 160 to localize digital text generated by the Optical Character Recognition Engine 130 that does not correspond to known language models. In addition to slang, acronyms, computer programming languages or markup languages, digital text generated by the Optical Character Recognition Engine 130 that does not correspond to known language models can also be associated with images embedded in the digital image used to generate the digital text, poor scanning of the digital image or poor image processing (e.g. image cropping, image warping) of the digital image. Consequently, this localization of digital text that does not correspond to language models allows the Text Evaluation Engine 160 to identify systematic errors in the processing of digital images to text using optical character recognition.

The calculation of the local language-conditional likelihood further allows the Text Recognition Engine 160 to recognize the language which concords best with digital text generated by the Optical Character Recognition Engine 130. The automated recognition is beneficial in large scale optical character recognition projects where it would be impossible or expensive to manually curate or validate language assignment. As the local language-conditional likelihoods are associated with individual characters, this technique further enables the Text Recognition Engine 160 to identify digital text associated with multiple languages in a scanned document (e.g. a document that is in English but contains Mandarin characters).

The Network 114 represents the communication pathways among the Optical Character Recognition Engine 130, the Machine Translation Engine 150, the Text Evaluation Engine 160 and any other entities connected to the Network 114. In one embodiment, the Network 114 is the Internet. The Network 114 can also utilize dedicated or private communications links that are not necessarily part of the Internet. In one embodiment, the Network 114 uses standard communications technologies and/or protocols. Thus, the Network 114 can include links using technologies such as Ethernet, 802.11, integrated services digital network (ISDN), digital subscriber line (DSL), asynchronous transfer mode (ATM), etc. Similarly, the networking protocols used on the Network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the Network 114 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the Optical Character Recognition Engine 130, the Text Evaluation Engine 160 and the Machine Translation Engine 150 use custom and/or dedicated data communications technologies instead of, or in addition to, the ones described above.

Figure 2:
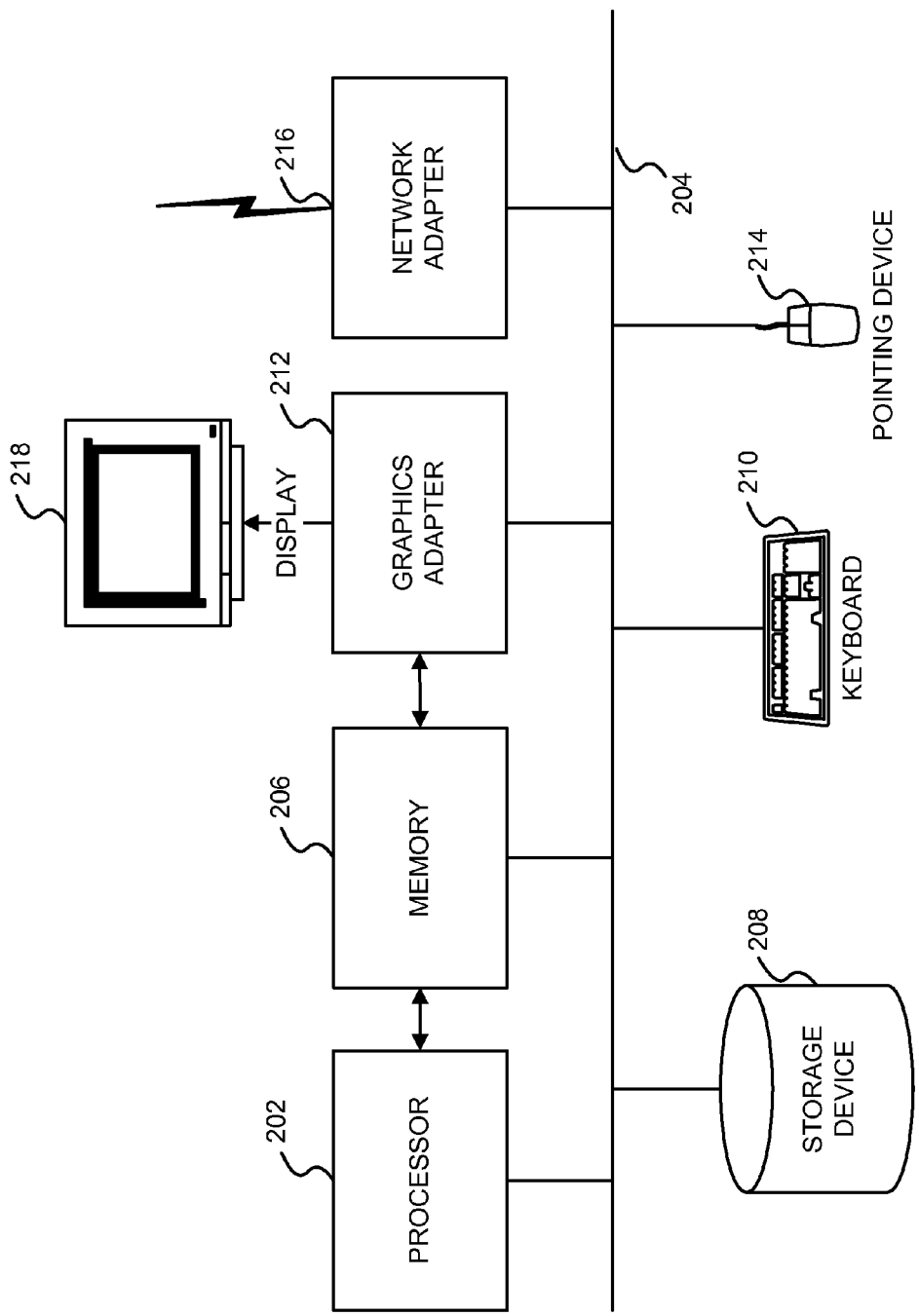
FIG. 2 is a high-level block diagram illustrating a functional view of a typical computer for use as the Optical Character Recognition Engine 130, a Machine Translation Engine 150 and/or Text Evaluation Engine 160 illustrated in the environment of FIG. 1 according to one embodiment.

FIG. 2 is a high-level block diagram illustrating a functional view of a typical computer 200 for use as the Optical Character Recognition Engine 130, the Text Evaluation Engine 160 and the Machine Translation Engine 150 illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216.

The display 210 provides output generated by the processor 202. The display 218 is coupled to the graphics adapter 212. The graphics adapter 212 generates visual data in a format compatible to the display 210. According to the embodiment, the display 210 may use any of the following technologies to display output: liquid crystal display, cathode ray tubes, plasma display, organic light emitting diodes, projections technologies or surface conduction electron emitter displays.

The processor 202 may be any general-purpose processor such as an INTEL x86 compatible-CPU. The storage device 208 is, in one embodiment, a hard disk drive but can also be any other computer-readable storage medium capable of storing data, such as a writeable compact disk (CD) or DVD, or a solid-state memory device. The memory 206 may be any type of computer-readable storage medium, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the Network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 used by the entities of FIG. 1 can vary depending upon the embodiment and the processing power required by the entity. For example, the Optical Character Recognition Engine 130 can include one or more distributed physical or logical computers operating together to provide the functionalities described herein. The computers 200 can lack some of the components described above, such as keyboards 210, graphics adapters 212, and displays 218.

Figure 3:
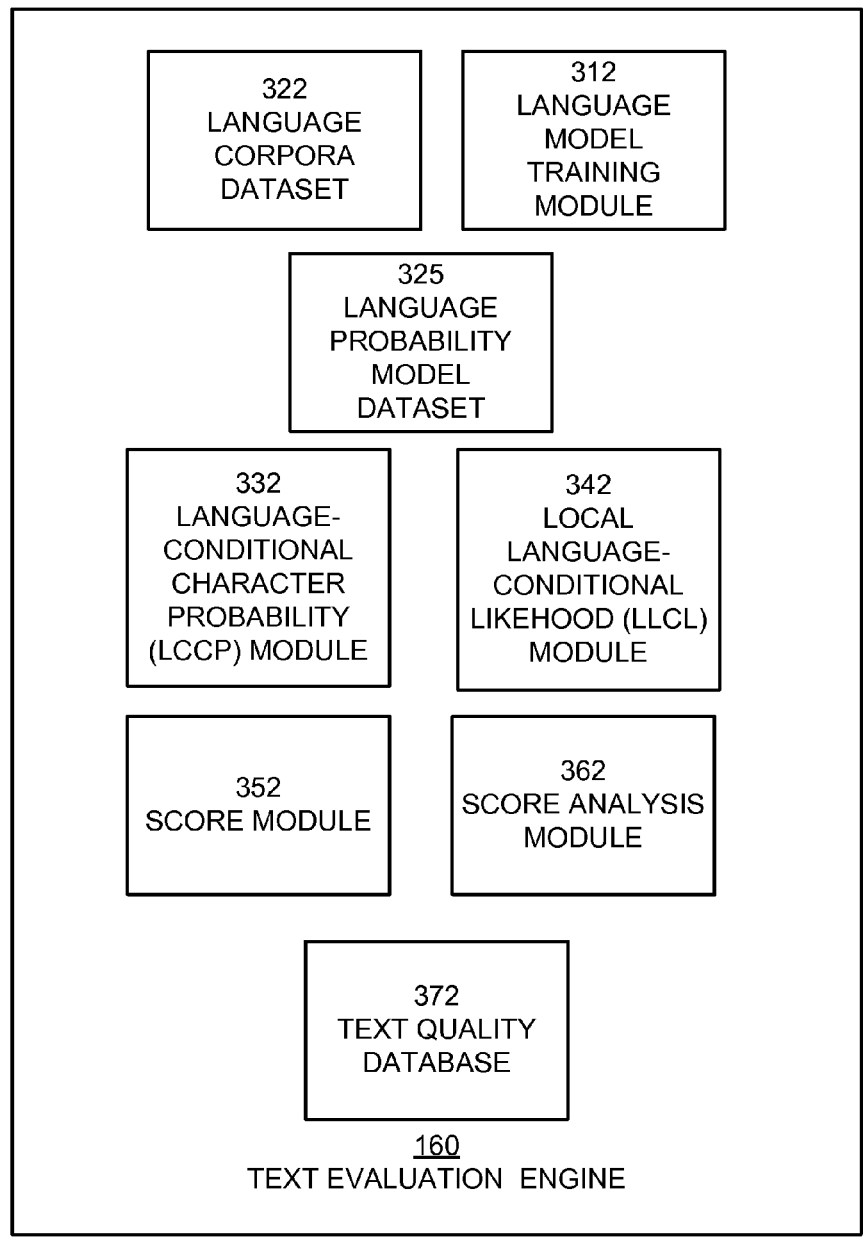
FIG. 3 is a high-level block diagram illustrating modules within the Text Evaluation Engine 130 according to one embodiment.

FIG. 3 is a high-level block diagram illustrating modules within the Text Evaluation Engine 160 according to one embodiment. As shown in FIG. 3, the Text Evaluation Engine 160 includes several modules. Those of skill in the art will recognize that other embodiments of the Text Evaluation Engine 160 can have different and/or other modules than the ones described here, and that the functionalities can be distributed among the modules in a different manner.

The Language Corpora Dataset 322 stores a set of corpora for different languages and/or writing systems. A writing system consists of a set of character symbols and grammatical rules. Writing systems are generally associated with languages, with some languages having more than one writing system. Each writing system is associated with a corpus of digital text that is known to be written in the writing system. The corpus of digital text associated with each writing system is selected to contain digital text from diverse sources in order to ensure comprehensive representation of the vocabulary associated with the writing system.

The Language Model Training Module 312 builds a set of language probability models based on the Language Corpora Dataset 322. The Language Model Training Module 312 parses the corpora associated with each writing system into a set of ordered tokens where each token represents a character. In one embodiment, the tokens are Unicode characters. The Language Model Training Module 312 enumerates the frequency at which each token in the ordered set of tokens precedes each other token in the corpora. The Language Model Training Module 312 generates a conditional probability value specifying the likelihood that a token will occur if it is preceded by one or more tokens in the writing system. The Language Model Training Module 312 stores the set of conditional probabilities as a language probability model in the Language Probability Model Dataset 325.

In some embodiments, the Language Model Training Module 312 generates a "catch all" model based on digital text associated with all of the language models in the Language Corpora Dataset 322. The catch all model is a type of language model which specifies the conditional probability of all characters in all writing systems. Accordingly, the conditional probabilities of characters specific to a writing system are lower in the catch all model than in the language model for the writing system. Conversely, the conditional probabilities of characters from different writing systems or garbage text will be higher than in the language models specific to a writing system. In a specific embodiment, the Language Model Training Model 312 generates a bi-gram model which specifies the conditional probability of each character given another character based on the digital text associated with all of the writing systems in the Language Corpora Dataset 322.

The Language-Conditional Character Probability (LCCP) Module 332 generates language-conditional character probabilities specifying the likelihood a character is written in a language based on the set of language probability models. The LCCP Module 322 communicates with the Machine Translation Engine 150 and the Optical Character Recognition Engine 130. The LCCP Module 322 receives a set of digital text comprising an ordered sequence of characters from the Machine Translation Engine 150 or the Optical Character Recognition Engine 130. In embodiments where the set of digital text is received from the Optical Character Recognition Engine 130, the characters are associated with a set of two-dimensional coordinates specifying their position in an image.

For each target character in the received text, the LCCP Module 332 identifies the k previous characters in the ordered sequence of characters. In most embodiments, the value of k will range from 5-10. In a specific embodiment, the value of k is 8. The LCCP Module 332 generates a language-conditional character probability for the target character based on the conditional probabilities associated with the k previous characters in the language probability model. In a specific embodiment, the LCCP Module 332 generates the language-conditional character probability based on the conditional probability of the target character based on the negative logarithm of the condition probability of the target character given the k previous characters. The LCCP Module 332 transmits the language-conditional character probabilities in association with the target character to the Local Language-Conditional Likelihood Module 342.

In embodiments where the catch all model is used, the LCCP Module 332 uses both the catch all model and the language models to generate language probability values. As opposed to the language models, the language-conditional character probabilities generated using the catch all model are neither overly high nor low. Therefore, characters within an ordered sequence of text which does not concord with a specific writing system or language will be associated with a set of language-conditional character probabilities where the language probably value generated using the catch all model will indicate the highest likelihood value.

In some embodiments, the LCCP Module 332 uses "back off smoothing" to determine the language-conditional character probabilities. Smoothing is the process of flattening a probability distribution implied by a language model so that all reasonable word sequences can occur with some probability. This often involves broadening the distribution by redistributing weight from high probability regions to zero probability regions. Suitable smoothing techniques include additive smoothing, Good-Turing estimate, Jelinek-Mercer smoothing, absolute discounting and Katz smoothing. Back off smoothing is a technique used to approximate the probability of a higher order n-gram using lower order n-grams. In these embodiments, the LCCP Module 332 approximates the language-conditional character probability for a character given the k previous characters based on combining the conditional probabilities associated with lower order subsets (i.e. k−1) of the previous characters. In specific embodiments, the LCCP Module 332 uses Witten-Bell or Moffat smoothing to approximate the language probability value.

The Local Language-Conditional Likelihood (LLCL) Module 342 generates a local language-conditional likelihood associated with a target character and its location which indicates the quality of the text surrounding the target character. For each target character, the LLCL Module 342 determines a set of neighbor characters that are proximate to the character based on the location of the character and determines the local language-conditional likelihood based on the set of language-conditional character probabilities associated with the set of neighbor characters.

In a specific embodiment, the LLCL Module 342 determines the set of neighbor characters that are proximate to the character using a low pass filter. The low pass filter determines a two-dimensional or one-dimensional area in which the character is at the center. In a specific embodiment, the low pass filter is a Gaussian low pass filter. According to the embodiment, the low pass filter may be isotropic or anisotropic. The scale associated with the low pass filter may vary according to the font-size or typesetting metrics associated with the document image. In embodiments where the low pass filter is anisotropic, the area defined by the filter may have greater extent based on the direction in which lines are typeset The LLCL 342 identifies the characters included within the one-dimensional or two-dimensional area as the neighbor characters. In a specific embodiment, the LLCL Module 342 identifies the set of neighbor characters within the two-dimensional area defined by the low-pass filter area using a grid-based system, wherein a set of grid points representing evenly spaced coordinates in a document image are identified and the distance between each character and each grid point is calculated. The use of the grid points prevents expensive and unnecessary calculations of distances between characters which are not proximate in the document image.

In some embodiments, the LLCL Module 342 further assigns a weight to each neighbor character that is inversely proportional to its distance from the target character. In most embodiments, the LLCL Module 342 only identifies one set of neighbor characters and associated weights for each target character. In alternate embodiments, the LLCL Module 342 may identify different sets of neighbor characters and associated weights for each target character corresponding to different language models.

The LLCL Module 342 identifies the set of language-conditional character probabilities associated with each of the neighbor characters and the target character. The LLCL Module 342 combines the set of language-conditional character probabilities associated the neighbor characters and the target character to generate a local language-conditional likelihood. The local language-conditional likelihood represents the quality of the text at the location associated with the target character. The local language-conditional likelihood further specifies the language model which best concords with the target character and its neighbor characters.

In one embodiment, The LLCL Module 342 combines the set of language-conditional character probabilities associated with the neighbor character and the target character for each language model to generate a first value $p(m|x)$ which represents the probability that the text is written in the writing system specified by the language model given the character/location x. The LLCL Module 342 can combine the set of language-conditional character probabilities associated with the neighbor character and the target character for each language model in any way to generate $p(m|x)$. In one embodiment, the LLCL Module 342 averages the set of language-conditional character probabilities associated with the neighbor character and the target character for each language model to generate $p(m|x)$. In a specific embodiments, the set of language-conditional character probabilities are exponentiated and normalized to generate $p(m|x)$.

The LLCL 342 then combines the values $p(m|x)$ for each language model to generate a local language-conditional likelihood. In one embodiment, the filtered values for each language model $p(m|x)$ are multiplied by the language-conditional character probability for the target character given the language model. In a specific embodiment, the filtered values for each language model are exponentiated and normalized to yield posterior probabilities $p(m|x)$, which are multiplied by the logarithm of the probability for the target character given the language model. This product is calculated for each language model and summed over all the language models to generate a local language-conditional likelihood which represents the mixture cross entropy rate of the values $p(m|x)$ for each language model.

In other embodiments, the set of language-conditional character probabilities associated the neighbor characters and target character are combined to generate a local language-conditional likelihood using other algorithms and/or techniques. Suitable algorithms and/or techniques for combining the language-conditional character probabilities include but are not limited to: using an explicit state transition model to model the changes in concordance to a language model over the sequence of characters. Similarly, neighbor characters may be identified by segmentation of the sequence of characters into different language segments using a Viterbi algorithm.

The Score Module 352 combines the local language-conditional likelihoods with additional information used to assess the quality of automatically generated digital text. Additional information used to generate scores used to assess the quality of automatically generated digital text may include, for example character morphology information, dictionary information or pixel intensity information. The additional information associated with a character may be derived at any level of the text analysis (e.g. word-level, character-level or image level). In some embodiments, the Score Module 352 does not combine the local language-conditional likelihood with additional information but instead uses the local language-conditional likelihood as the text quality score.

In a specific embodiment, the Score Module 352 combines the local language-conditional likelihoods with the conditional entropy values that are specific to the writing system or language specified by the language models. In this embodiment, the Score Module 352 multiplies the filtered values for each language model $p(m|x)$ by the cross-entropy rate specific to the language model. The Score Module 352 sums these products over all the language models to generate a mixture threshold value for each character. The Score Module 352 generates the text quality score associated with each character by subtracting the mixture threshold value associated with the character from the local language-conditional likelihood associated with the character. The Score Module 352 stores the text quality scores in the Text Quality Database 372.

The Score Analysis Module 362 combines the set of text quality scores associated with a specific subset of characters representing digital text in order to generate values used to characterize the quality of the subset of digital text. The Score Analysis Module 362 may average the text quality scores associated with the specified subset of characters representing digital text to generate values used to assess the quality of automatically generated text based on different criteria.

In one embodiment, the Score Analysis Module 362 can combine text quality scores for characters associated with a pre-defined periods of time (e.g. minute, hour, day) to generate a value that represents the quality of text generated at the pre-defined periods of time. The Score Analysis Module 362 then analyzes the values that represent the quality of text generated at the pre-defined periods of time to determine whether the pre-defined periods of time are associated with low text quality scores. By identifying periods of time associated with low text quality scores, the Score Analysis Module 362 can identify systemic errors in large scale text generation. For instance, the Score Analysis Module 362 may identify a period of time associated with poor text quality that is concurrent with an update in code for software used by the Optical Character Recognition Engine 130 to process a document image. In one embodiment, the Score Analysis Module 362 displays a plot of the values that represent the quality of text generated at the pre-defined periods of time. The Score Analysis Module 362 stores the values in the Text Quality Database 372.

In another embodiment, the Score Analysis Module 362 can identify a subset of characters associated with other criteria such as the language of the text, metrics associated with the document image processing and metrics associated with the OCR. The Score Analysis Module 362 can then combine the text quality scores associated with the other criteria in order to generate a value that represents the quality of the text associated with the criteria. The Score Analysis Module 362 stores the value that represents the quality of the text associated with the criteria in the Text Quality Database 372.

For embodiments where the digital text is generated from a document image by the Optical Character Recognition Engine 130, the Score Analysis Module 362 identifies segments of the document image that are associated with different text quality scores using supervising and unsupervised learning methods. In supervised learning methods, the Score Analysis Module 362 identifies these segments of the document image by subjecting the text quality scores to a specified threshold value and partitioning the document into segments according to the value. In unsupervised learning methods, the Score Analysis Module 362 "learns" where segment boundaries exist by applying supervised learning algorithms such as decision tree models to the text quality scores in association with their two-dimensional coordinates. In a specific embodiment, the decision tree model is a Classification And Regression Tree (CART). The Score Analysis Module 362 stores data representing the segments such as a set of coordinates defining the segments and their corresponding text quality scores in the Text Quality Database 372.

The Text Quality Database 372 stores text value scores for characters in association with information describing the document image and/or digital text associated with the characters. According to the embodiment, the Text Quality Database 372 can store additional information associated with the document and/or digital text such as when the digital text was generated or data associated with the document image such as scanning parameters. The Text Quality Database 372 can further store information used to generate the text quality scores such as the location of the target character or the language-conditional character probability of the target character and/or neighbor characters. In some embodiments, the Text Quality Database 372 will combine text quality scores for sentences, paragraphs or other portions of automatically generated digital text and store the combined text quality score. The Text Quality Database 372 further stores data produced by the Score Analysis Module 362.

Figure 4:
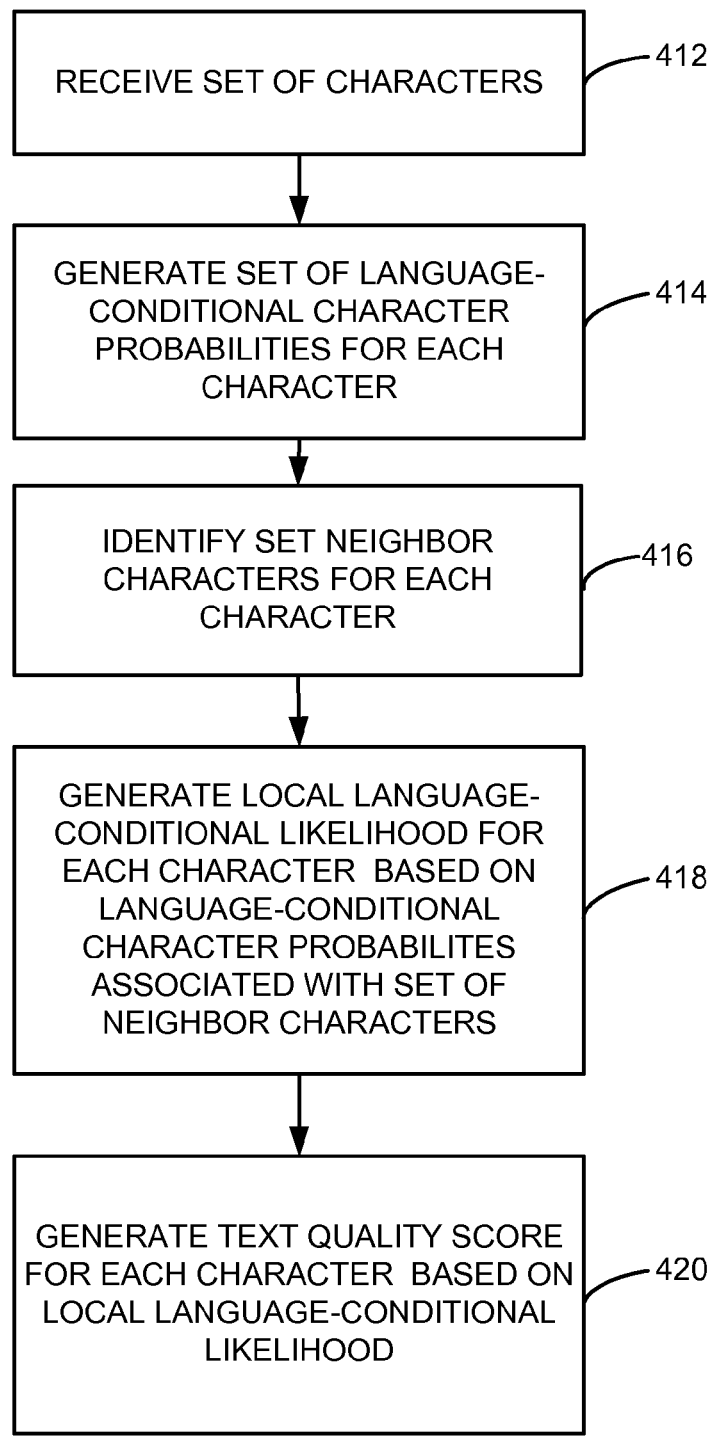
FIG. 4 is a flowchart illustrating a view of steps performed by an embodiment of the Text Evaluation Engine 130 to generate text quality scores according to one embodiment.

FIG. 4 is a flowchart illustrating a detailed view of steps performed by an embodiment of the Text Evaluation Engine 160 in generating text quality scores associated with characters. Other embodiments perform the illustrated steps in different orders, and/or perform different or additional steps. Moreover, some of the steps can be performed by engines or modules other than the Text Evaluation Engine 160.

The Text Evaluation Engine 160 receives 412 a set of characters associated with an ordered sequence representing digital text from the Optical Character Recognition Engine 130 or the Machine Translation Engine 150. If the set of characters is received from the Optical Character Recognition Engine 130, the received set of characters are further associated with coordinates specifying a position of the characters in a document image.

The Text Evaluation Engine 160 generates 414 a set of language-conditional character probabilities for each target character based on the ordered sequence and a set of language probability models stored in the language probability model dataset 325. The Text Evaluation Engine 160 identifies 416 a set of neighbor characters for each target character. The Text Evaluation Engine 160 generates 418 a local language-conditional likelihood for each target character based on set the language-conditional character probabilities associated with each character of the set of neighbor characters. The Text Evaluation Engine 160 generates 420 a text quality score for each target character based on the local language-conditional likelihood and additional information describing the quality of the text. In some embodiments, the text quality score is equal to the local language-conditional likelihood.

Figure 5:
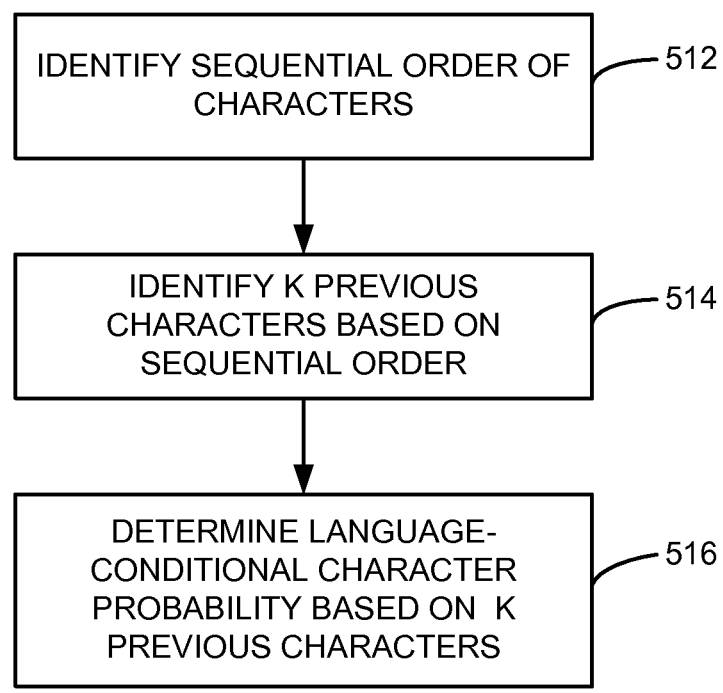
FIG. 5 is a flowchart illustrating a detailed view of steps performed by an embodiment of the Text Evaluation Engine 130 to determine language-conditional character probabilities according to one embodiment.

FIG. 5 is a flowchart illustrating a more detailed view of steps performed by the Text Evaluation Engine 160 in generating feature vectors according to one embodiment. Other embodiments perform the illustrated steps in different orders, and/or perform different or additional steps. Moreover, some of the steps can be performed by engines or modules other than the Text Evaluation Engine 160.

The Text Evaluation Engine 160 identifies 512 a sequential order of characters associated with a target character. The Text Evaluation Engine 160 identifies 514 a set of k characters that precede the target character in the sequential order. The Text Evaluation Engine 160 determines 516 a language-conditional character probability associated with the target character based on the set of k characters and a language probability model.

Figure 6:
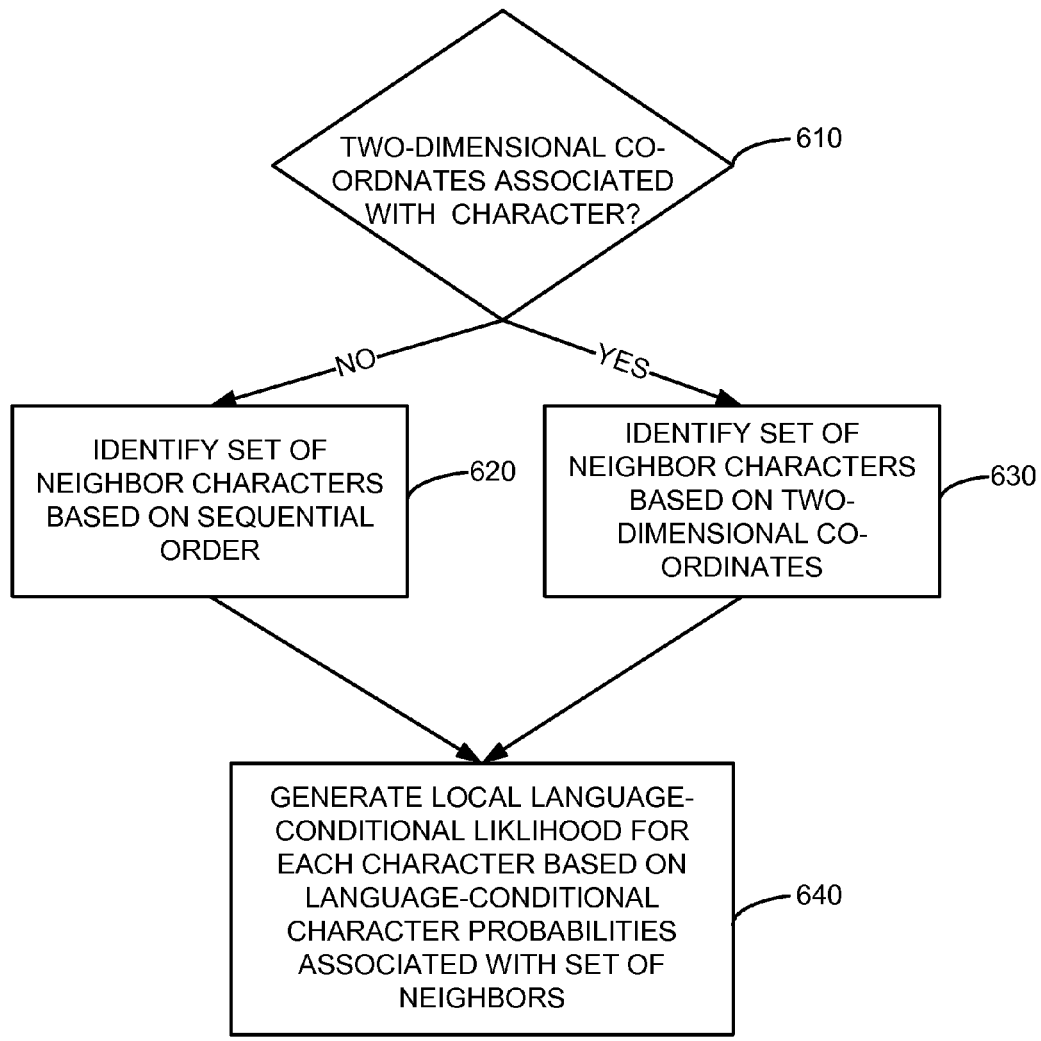
FIG. 6 is a flowchart illustrating a detailed view of steps performed by an embodiment of the Text Evaluation Engine 130 to generate local language-conditional likelihoods according to one embodiment.

FIG. 6 is a flowchart illustrating a more detailed view of steps performed by the Text Evaluation Engine 160 in generating feature vectors according to another embodiment. Other embodiments perform the illustrated steps in different orders, and/or perform different or additional steps. Moreover, some of the steps can be performed by engines or modules other than the Text Evaluation Engine 160.

The Text Evaluation Engine 160 determines 610 whether a character is associated with two-dimensional coordinates specifying the location of a character in a document image. If Text Evaluation Engine 160 determines 610 the character is not associated with a location, the Text Evaluation Engine 160 identifies a set of neighbor characters that are proximate to the target characters in the sequential order of characters. If the Text Evaluation Engine 160 determines 610 the character is associated with a set of two-dimensional coordinates, the Text Evaluation Engine 160 identifies 630 a set of neighbor characters that are proximate to the target character in the document image. The Text Evaluation Engine 160 generates 640 a local language-conditional likelihood for the target character based on the set of language-conditional character probabilities associated with the neighbor characters.

Figure 7:
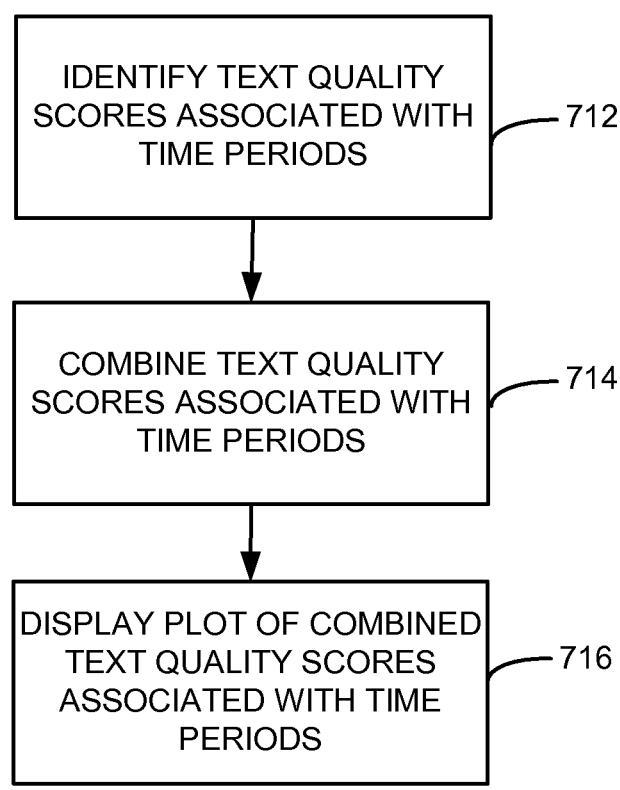
FIG. 7 is a flowchart illustrating a detailed view of steps performed by an embodiment of the Text Evaluation Engine 130 to plot text quality scores in association with time periods according to one embodiment.

FIG. 7 is a flowchart illustrating a more detailed view of steps performed by the Text Evaluation Engine 160 in plotting text quality scores according to one embodiment. Other embodiments perform the illustrated steps in different orders, and/or perform different or additional steps. Moreover, some of the steps can be performed by engines or modules other than the Text Evaluation Engine 160.

The Text Evaluation Engine 160 identifies 712 sets of text quality scores associated with a time period. The Text Evaluation Engine 160 combines 714 the set of text quality scores associated with time periods to generate representative scores. The Text Evaluation Engine 160 displays a plot of the representative scores in association with the time periods.

Figure 8:
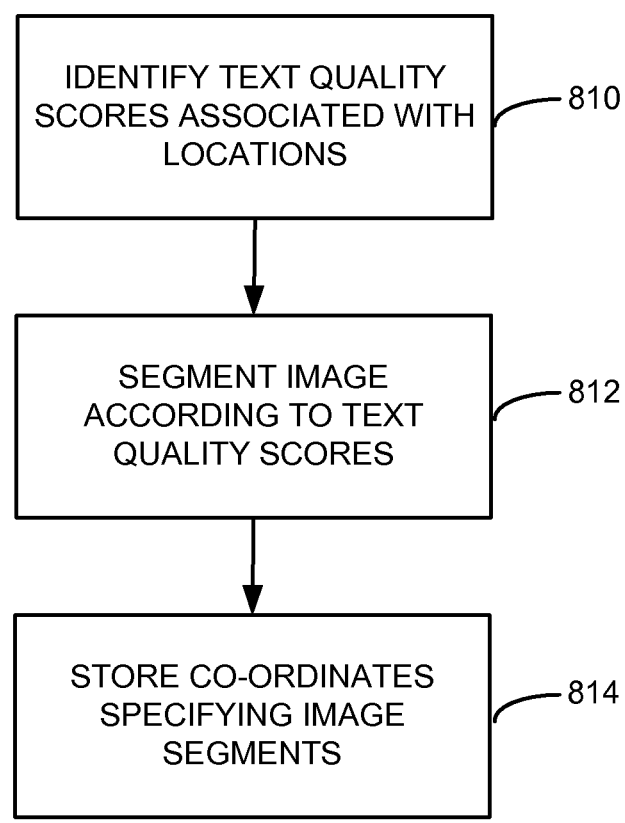
FIG. 8 is a flowchart illustrating a detailed view of steps performed by an embodiment of the Text Evaluation Engine 130 to segment the document images based on the text value scores according to one embodiment.

FIG. 8 is a flowchart illustrating a more detailed view of steps performed by the Text Evaluation Engine 160 in generating text quality scores in associated with segments of document images according to one embodiment. Other embodiments perform the illustrated steps in different orders, and/or perform different or additional steps. Moreover, some of the steps can be performed by engines or modules other than the Text Evaluation Engine 160.

The Text Evaluation Engine 160 identifies text quality scores associated with characters at specified locations in a document image. The Text Evaluation Engine 160 identifies sets of coordinates specifying segments of the document image associated with similar text quality scores based on locations associated with the characters. The Text Evaluation Engine 160 identifies a representative text quality score for each segment of the document image. The Text Evaluation Engine 160 stores the representative text quality score in association with a set of coordinates specifying the segments of the document image.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of assessing quality of computer-generated text in a document image, the method comprising:
    identifying text quality scores associated with a plurality of digital text characters generated from the document image, a text quality score for a target character describing a likelihood of the target character being at a location of the target character within the document image;
    identifying a plurality of subsets of characters having associated text quality scores that differ from text quality scores associated with neighboring characters in the document image by more than a threshold value;
    segmenting the document image into a plurality of segments associated with different text quality scores responsive to the identified plurality of subsets of characters;
    determining a representative text quality score for each segment of the document image; and
    storing the representative text quality scores in association with the segments.

2. The method of claim 1, wherein segmenting the document image in a plurality of segments comprises:
    forming boundaries between a first subset of characters neighboring a second subset of characters in response to a difference between a first text quality score associated with the first subset of characters and a second text quality score associated with the second subset of characters exceeding the threshold value.

3. The method of claim 1, wherein identifying a subset of characters having associated text quality scores that differ from text quality scores associated with neighboring characters in the image comprises:
    identifying neighboring characters in the document image having similar text quality scores; and
    adding the neighboring characters in the document image having similar text quality scores to the subset of characters.

4. The method of claim 1, wherein identifying a subset of characters having associated text quality scores that differ from text quality scores associated with neighboring characters in the image comprises:
    combining the text quality scores of the characters in the identified subset to produce a combined text quality score representing the identified subset of characters; and
    wherein the segmenting segments the document image responsive to the combined text quality score.

5. The method of claim 1, wherein the threshold value defines a maximum difference of text quality scores for characters to be included in a given subset of characters.

6. The method of claim 5, further comprising adding a neighboring character to the given subset of characters in response to determining that a difference between an average value of text quality scores associated with the characters included in the given subset and a text quality score associated with the neighboring character subset is less than the threshold value.

7. The method of claim 1, wherein storing the representative text quality scores further comprises:
    storing coordinates specifying a location in the document image of the segment associated with each representative text quality score.

8. A computer system for segmenting a document image, comprising:
    a processor for executing computer program instructions;
    a non-transitory computer-readable storage medium storing executable computer program instructions, the computer-readable storage medium comprising:
        a score module configured to identify text quality scores associated with a plurality of digital text characters generated from the document image, a text quality score for a target character describing a likelihood of the target character being at a location of the target character within the document image;
        a score analysis module configured to:
            identify a plurality of subsets of characters having associated text quality scores that differ from text quality scores associated with neighboring characters in the document image by more than a threshold value;
            segment the document image into a plurality of segments associated with different text quality scores responsive to the identified plurality of subsets of characters; and
            determine a representative text quality score for each segment of the document image; and
        a text quality database configured to store the representative text quality scores in association with the segments.

9. The system of claim 8, wherein segmenting the document image in a plurality of segments comprises:
    forming boundaries between a first subset of characters neighboring a second subset of characters in response to a difference between a first text quality score associated with the first subset of characters and a second text quality score associated with the second subset of characters exceeding the threshold value.

10. The system of claim 8, wherein identifying a subset of characters having associated text quality scores that differ from text quality scores associated with neighboring characters in the image comprises:
    identifying neighboring characters in the document image having similar text quality scores; and
    adding the neighboring characters in the document image having similar text quality scores to the subset of characters.

11. The system of claim 8, wherein identifying a subset of characters having associated text quality scores that differ from text quality scores associated with neighboring characters in the image comprises:
    combining the text quality scores of the characters in the identified subset to produce a combined text quality score representing the identified subset of characters; and wherein the segmenting segments the document image responsive to the combined text quality score.

12. The system of claim 8, wherein the threshold value defines a maximum difference of text quality scores for characters to be included in a given subset of characters.

13. The system of claim 12, further comprising adding a neighboring character to the given subset of characters in response to determining that a difference between an average value of text quality scores associated with the characters included in the given subset and a text quality score associated with the neighboring character subset is less than the threshold value.

14. The system of claim 8, wherein storing the representative text quality scores further comprises:
   storing coordinates specifying a location in the document image of the segment associated with each representative text quality score.

15. A non-transitory computer-readable storage medium storing executable computer program instructions for performing steps comprising:
   identifying text quality scores associated with a plurality of digital text characters generated from the document image, a text quality score for a target character describing a likelihood of the target character being at a location of the target character within the document image;
   identifying a plurality of subsets of characters having associated text quality scores that differ from text quality scores associated with neighboring characters in the document image by more than a threshold value;
   segmenting the document image into a plurality of segments associated with different text quality scores responsive to the identified plurality of subsets of characters;
   determining a representative text quality score for each segment of the document image; and
   storing the representative text quality scores in association with the segments.

16. The storage medium of claim 15, wherein segmenting the document image in a plurality of segments comprises:
   forming boundaries between a first subset of characters neighboring a second subset of characters in response to a difference between a first text quality score associated with the first subset of characters and a second text quality score associated with the second subset of characters exceeding the threshold value.

17. The storage medium of claim 15, wherein identifying a subset of characters having associated text quality scores that differ from text quality scores associated with neighboring characters in the image comprises:
   identifying neighboring characters in the document image having similar text quality scores; and
   adding the neighboring characters in the document image having similar text quality scores to the subset of characters.

18. The storage medium of claim 15, wherein identifying a subset of characters having associated text quality scores that differ from text quality scores associated with neighboring characters in the image comprises:
   combining the text quality scores of the characters in the identified subset to produce a combined text quality score representing the identified subset of characters; and
   wherein the segmenting segments the document image responsive to the combined text quality score.

19. The storage medium of claim 15, wherein the threshold value defines a maximum difference of text quality scores for characters to be included in a given subset of characters.

20. The storage medium of claim 19, further comprising adding a neighboring character to the given subset of characters in response to determining that a difference between an average value of text quality scores associated with the characters included in the given subset and a text quality score associated with the neighboring character subset is less than the threshold value.

21. The storage medium of claim 15, wherein storing the representative text quality scores further comprises:
   storing coordinates specifying a location in the document image of the segment associated with each representative text quality score.

\* \* \* \* \*